United States Patent
Song et al.

[11] Patent Number: 6,135,876
[45] Date of Patent: Oct. 24, 2000

[54] AIR COOLED MOUSE FOR A PERSONAL COMPUTER

[75] Inventors: Young Kil Song, 12932 Wolverton La., Cerritos, Calif. 90703; Clement Cheng, Temple City, Calif.

[73] Assignee: Young Kil Song, Norwalk, Calif.

[21] Appl. No.: 09/444,263

[22] Filed: Nov. 22, 1999

[51] Int. Cl.[7] .................................................. H05K 7/20
[52] U.S. Cl. ........................ 454/184; 345/163; 454/370
[58] Field of Search .................................. 454/184, 370; 345/163; 34/90

[56] References Cited

U.S. PATENT DOCUMENTS 4,595,070  6/1986  Hodges .
5,828,034  10/1998  Chang .

*Primary Examiner*—Harold Joyce
*Attorney, Agent, or Firm*—Clement Cheng

[57] ABSTRACT

This invention is a mouse for a personal computer, having channels such as holes, slots or a mesh in the mouse casing. Air is blown through the holes to cool a user's hand and comfort a user's hand. A fan or pump pressurizes an air chamber to blow air through the holes.

10 Claims, 3 Drawing Sheets

AIR COOLED MOUSE FOR A PERSONAL COMPUTER

CROSS REFERENCES TO RELATED APPLICATIONS

There are no cross references to other applications. Applicant has searched for analogous art and has found none.

BACKGROUND OF THE INVENTION

Currently, personal computers require input devices such as a mouse, a trackball, or the like. The current mouse on the market is usually contained in a plastic case that the user slides around on a flat surface. The case usually contains a rubber ball to detect motion.

After a long period of use a user's hands may become hot and sweaty especially in humid environments. During use, the user's hands must stay in contact with the casing of the mouse. Some users in the graphics or publishing business may hold a mouse for many hours a day. Prolonged contact with a smooth plastic surface can become uncomfortable. Thus, the industry needs a way to refresh a user's hand while the user is operating the mouse.

BRIEF SUMMARY OF THE INVENTION

This present invention is an improved mouse casing that cools a user's hand. The improvement uses air which is blown through a hose connected to the mouse or through a fan located on the mouse. Hole or slots on the surface of the mouse direct the air to the user's hand. The air flow will improve the comfort of the user's hand and promote user productivity.

BRIEF DESCRIPTION OF THE DRAWINGS

A detailed description of the embodiments of the invention will be made with reference to the accompanying drawings, wherein like numerals designate corresponding parts in figures.

DETAILED DESCRIPTION

The air mouse is a more comfortable desktop input device. The main idea is that air channels blow air at a user's hand to make the mouse more comfortable to hold. The air channels can be holes in the casing of the mouse, or slots or a mesh through which air is blown.

Figure 1:
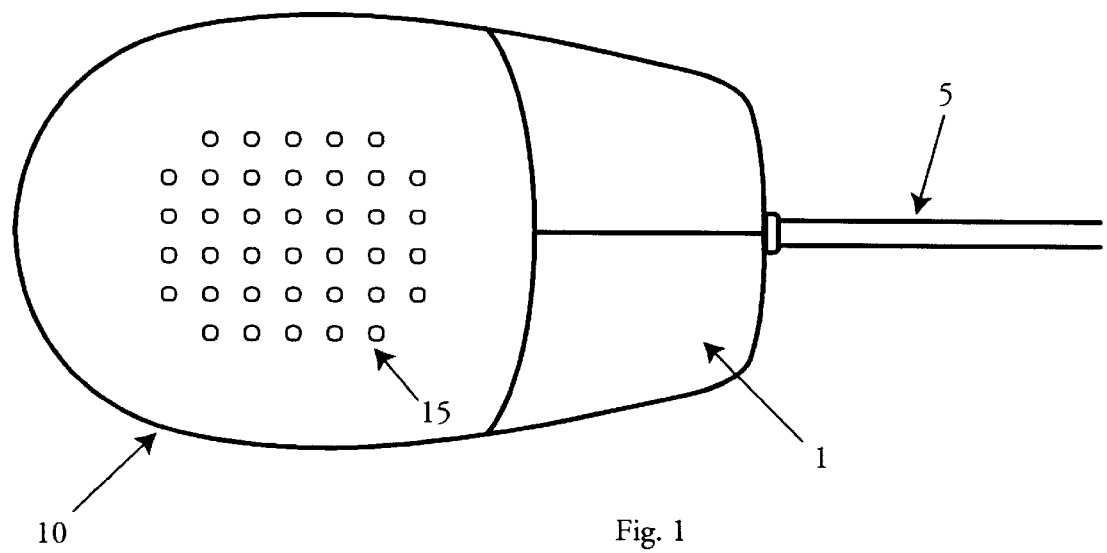
FIG. 1 is a top view of an air cooled mouse having air holes.
Figure 2:
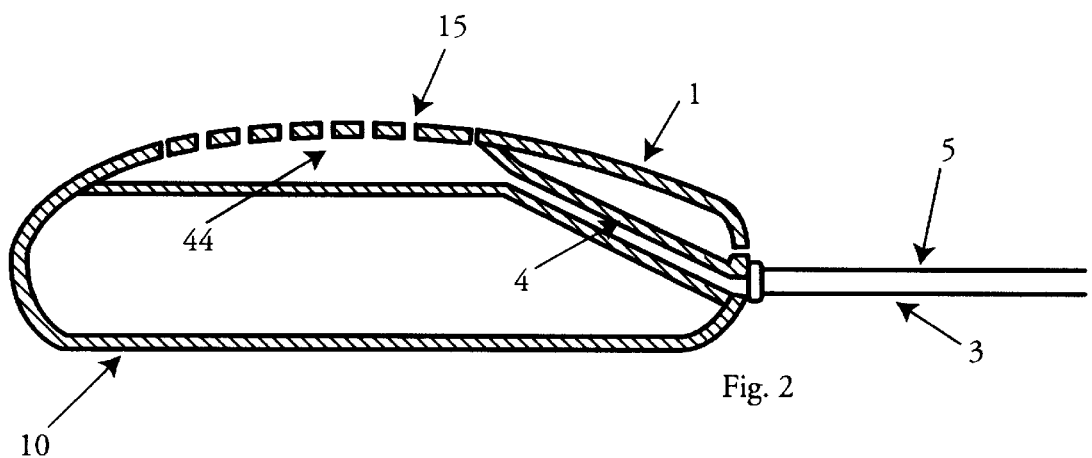
FIG. 2 is a side view of an air cooled mouse having air holes.

The mouse could function like an ordinary mouse but has a casing (10) with air holes (15) in the top of the casing. This is shown in FIG. 1. From the holes (15) is blown air to cool the mouse user's hand. The holes (15) allow a flow of air to be directed to the user's hand. This gives the mouse a fresh feel when grasped. The air flow also takes away the sticky feel commonly associated with holding a smooth plastic surface for an extended time.

The air holes connect to an air cavity (44) under the surface of the mouse casing (10). The air cavity (44) is pressurized and feeds air to the air holes. The air cavity (44) allows more uniform flow of air by distributing air pressure.

There are various means to pressurize the air chamber (44), also called an air cavity (44). The air chamber (44) can be pressurized by a fan (6) or air pump (6) inside or outside the mouse. Having a built in air cavity pressurization mechanism would add bulk and weight to the mouse, but would have the benefit of not requiring an air hose leading to the air cavity (44). The air mouse casing (10) could contain an air pressurization system. In this case a small air pump could be installed inside the mouse.

The air cavity (44) can also be pressurized by an air hose (5) which is attached to a fan or air pump that is located externally. This would allow a smaller and less bulky construction to the mouse. Many commercial air pumps made to pump air into fish tanks would suffice for this purpose.

Figure 3:
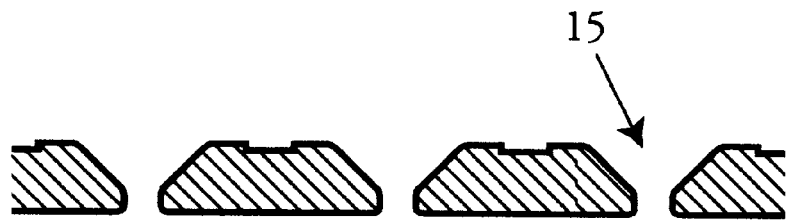
FIG. 3 is a Diagram of a preferred embodiment of air holes.

To have proper air flow into the mouse, the holes must be properly configured. The air holes in the top of the mouse can be ordinary cylindrically shaped holes. One problem with ordinary cylindrical holes is that a user may cover them up during use. To avoid this problem, several solutions may suffice. First, the holes (15) in the top of the mouse casing can be enlarged as shown in FIG. 3. The holes can taper as shown in FIG. 3 so that they have a larger exit diameter. By tapering the holes, they are less likely to be entirely covered by a user's hand.

Figure 4:
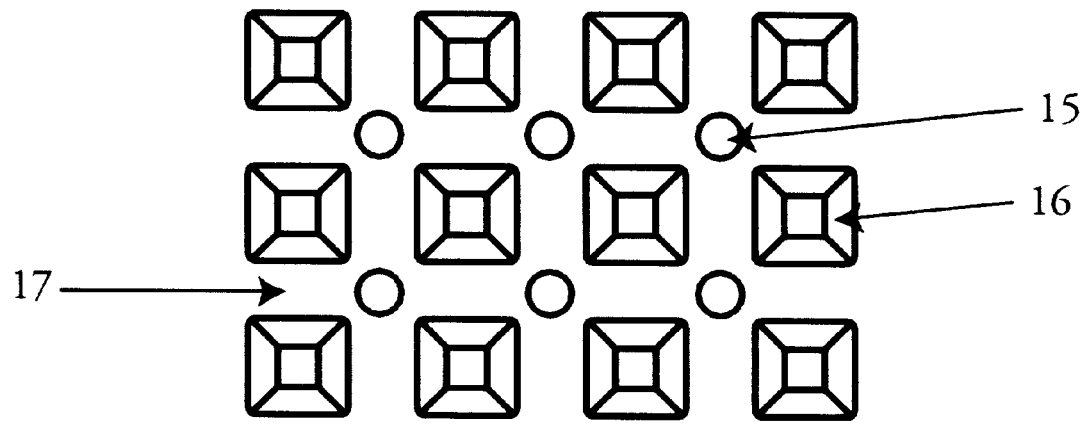
FIG. 4 is a Diagram of air holes with air hole ridges.

Secondly, air hole grooves (17) as shown in FIG. 4 can be added to redirect the air flow should a user cover up the holes (15). The air hole grooves (17) are formed by ridges (16) which raise the user's hand above the grooves (17) so that more air can blow at the user's hand.

Figure 5:
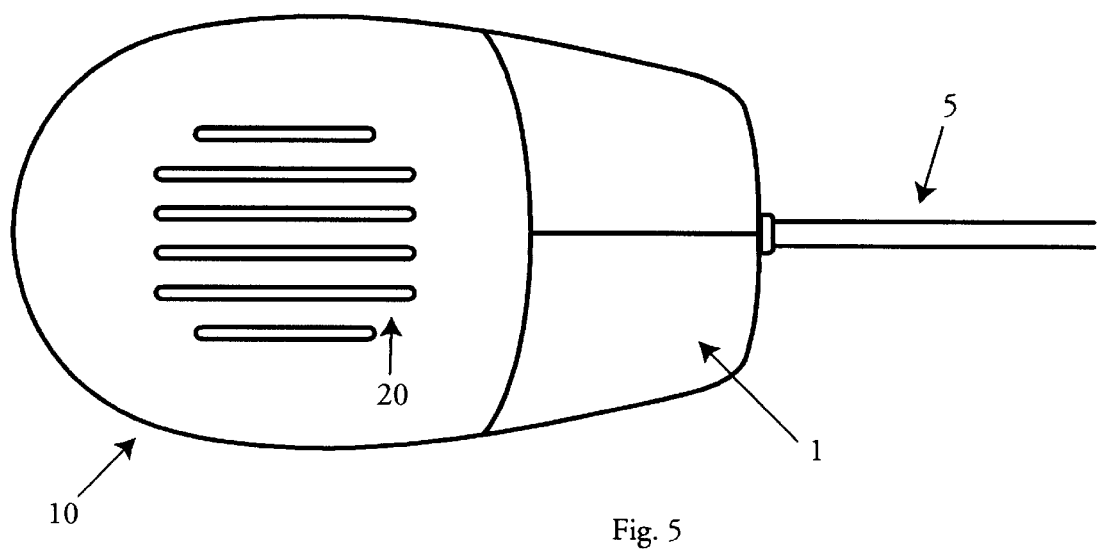
FIG. 5 is a top view of a mouse with air slots.
Figure 6:
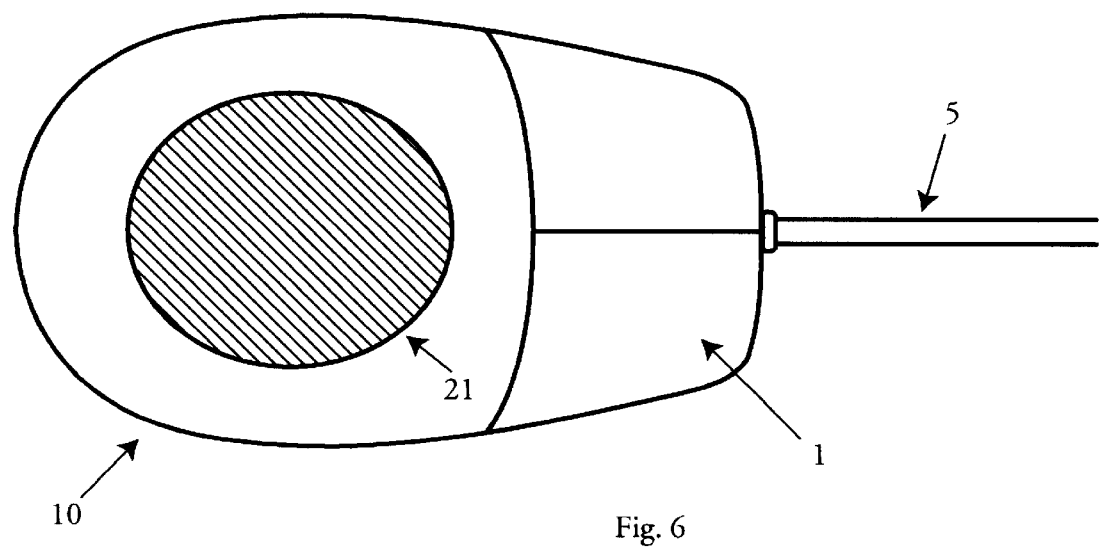
FIG. 6 is a top view of a mouse with an air mesh

Another embodiment includes air slots (20) as shown in FIG. 5. Air slots would allow a larger opening for escaping air. Also, the number of holes can be increased. One way to increase the number of holes is by using a mesh fabric (21) instead of forming holes in a plastic casing, as shown in FIG. 6. A cloth or mesh fabric material having many small holes could act as the surface that a user holds onto. Although some holes would be blocked, others would continue blowing air unto the user's hand. The air mesh (21) is also more comfortable to hold.

What is claimed is:

1. An air cooled mouse comprising:
    a) a casing;
    b) air channels formed by the casing whereby a user's hand can be cooled by the blowing of air through the air channels;
    c) an air chamber feeding air to the air channels;
    d) a means to pressurize the air chamber whereby air flows from the air chamber to the exit of the air channels.

2. The air cooled mouse of claim 1, wherein the means to pressurize the air chamber is an air pump, housed inside said casing, connected to the air chamber, capable of pressurizing the air chamber.

3. The air cooled mouse of claim 1, wherein the means to pressurize the air chamber is an air pump, housed outside said casing, the pump connected to and capable of pressurizing an air hose which in turn pressurizes the air chamber.

4. The air cooled mouse of claim 1 or 2, wherein the air channels are cylindrical holes.

5. The air cooled mouse of claim 4, wherein the air channels are holes that taper from a wide end to a narrow end, said wide end located on the exterior of the mouse casing, said narrow end located at the interior of the mouse casing.

6. The air cooled mouse of claim 4, further comprising ridges that are formed on the top of the mouse casing to raise a user's hand above the mouse holes, the ridges organized in such a formation as to form air grooves between the ridges, whereby more air can be blown through the air grooves at user's hand.

7. The air cooled mouse of claim 1 or 2, wherein the air channels are air slots that allow air to escape from the air chamber.

8. The air cooled mouse of claim 1 or 2, wherein the air channels are formed from a mesh whereby the air is blown through the mesh to cool the user's hand.

9. The air cooled mouse of claim 1 or 2, further comprising ridges formed in the top of the mouse casing to form air grooves, the ridges raising the user's hand above the air slots, whereby air is blown through the air grooves at the user's hand.

10. The air cooled mouse of claims 7, 8 and 9, where the air is blown through a mash at the user's hand.

\* \* \* \* \*